US012403969B1

(12) United States Patent
Bay

(10) Patent No.: US 12,403,969 B1
(45) Date of Patent: Sep. 2, 2025

(54) FRAME RACK FOR HANGING BICYCLE STORAGE AND STRETCHER-MANNER OF LOADING/UNLOADING AND BICYCLE FERRYING IN VEHICLES, ESPECIALLY THROUGH UPWARD SWINGING REAR DOORS

(71) Applicant: Jonathan A. Bay, Ozark, MO (US)

(72) Inventor: Jonathan A. Bay, Ozark, MO (US)

(73) Assignee: JONATHAN ALLAN BAY, TTEE UTA 5-12-2023, Springfield, MO (US)

( * ) Notice: Subject to any disclaimer, the term of this patent is extended or adjusted under 35 U.S.C. 154(b) by 264 days.

(21) Appl. No.: 18/051,076

(22) Filed: Oct. 31, 2022

Related U.S. Application Data

(60) Provisional application No. 63/274,181, filed on Nov. 1, 2021.

(51) Int. Cl.
B60R 9/10 (2006.01)
B62H 3/00 (2006.01)

(52) U.S. Cl.
CPC . *B62H 3/00* (2013.01); *B60R 9/10* (2013.01)

(58) Field of Classification Search
CPC .. B60R 9/10; B60R 9/048; B60R 7/02; B62H 3/00; B62H 3/06; B62H 3/12; A47B 87/001; A47B 81/00; A47F 5/01; A47F 5/13; A47F 7/04; Y10T 224/924
USPC ..... 224/924; 211/17, 20, 21, 22, 23, 24, 182
See application file for complete search history.

(56) References Cited

U.S. PATENT DOCUMENTS

| | | | | | |
|---|---|---|---|---|---|
| 1,587,090 | A | * | 6/1926 | Tweed | B65G 7/08 248/146 |
| 3,159,259 | A | * | 12/1964 | Reece | G07F 11/004 194/211 |
| 5,555,904 | A | * | 9/1996 | Stockwell | A61H 3/02 135/71 |
| 5,743,412 | A | * | 4/1998 | Noble | A47F 1/121 211/182 |
| 6,027,000 | A | * | 2/2000 | Sterzel | B60R 7/02 224/42.33 |
| 6,536,640 | B1 | * | 3/2003 | Gent | B60R 9/00 224/403 |
| 6,561,396 | B2 | * | 5/2003 | Ketterhagen | B60R 9/042 414/547 |
| 8,931,648 | B1 | * | 1/2015 | Tam | B62H 3/00 248/188.5 |
| 9,415,786 | B1 | * | 8/2016 | Lorrigan | B62B 1/206 |
| 9,474,368 | B2 | * | 10/2016 | Frankel | A47B 43/00 |
| 9,861,087 | B1 | * | 1/2018 | Arrazola | B62B 3/005 |
| 10,589,693 | B2 | * | 3/2020 | Stechschulte | B60R 9/048 |
| 10,617,069 | B2 | * | 4/2020 | MacDonald | A01G 9/12 |
| 2006/0169656 | A1 | * | 8/2006 | Belden | A47G 23/0208 211/84 |

(Continued)

*Primary Examiner* — Adam J Waggenspack
(74) *Attorney, Agent, or Firm* — Jonathan A. Bay

(57) ABSTRACT

A frame rack for stretcher-manner of loading/unloading and bicycle ferrying in passenger vehicles has a frame base deck contained in a base plane, a frame outer shelf spaced apart from the frame base deck, and a plurality of posts interconnecting and spacing apart the frame base deck and frame outer shelf. Essentially, the shelf of the rack would be about as wide as a subject bike's measured tire size, and about as long as a little bit in excess of the subject bike's measured wheel base (ie., distance between centers of the wheel axles).

18 Claims, 16 Drawing Sheets

(56) References Cited

U.S. PATENT DOCUMENTS

| | | | | |
|---|---|---|---|---|
| 2009/0302077 A1* | 12/2009 | Yee | ............................ | B60R 9/10 |
| | | | | 224/539 |
| 2014/0083005 A1* | 3/2014 | Collins | .................. | F16M 11/42 |
| | | | | 280/35 |

* cited by examiner

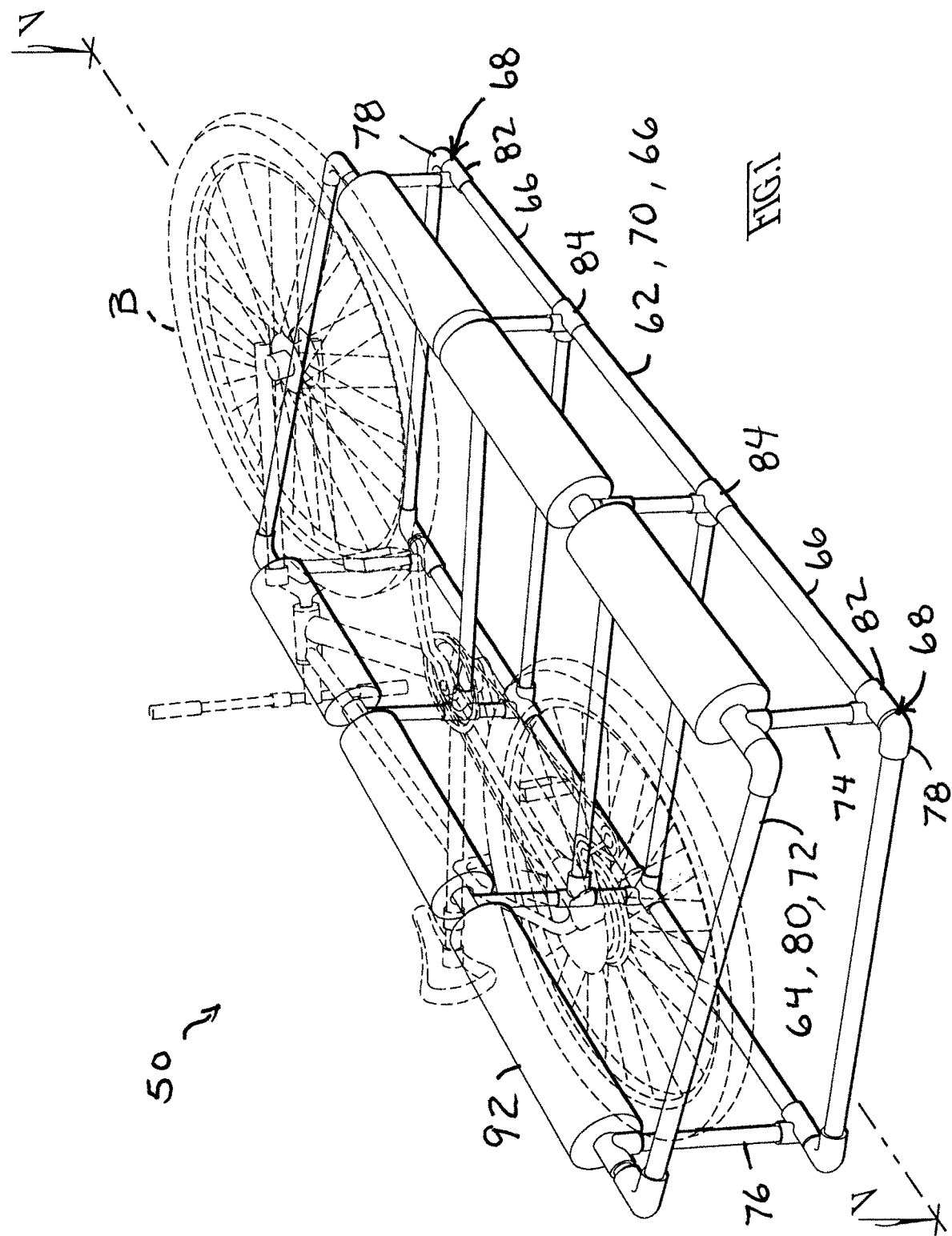

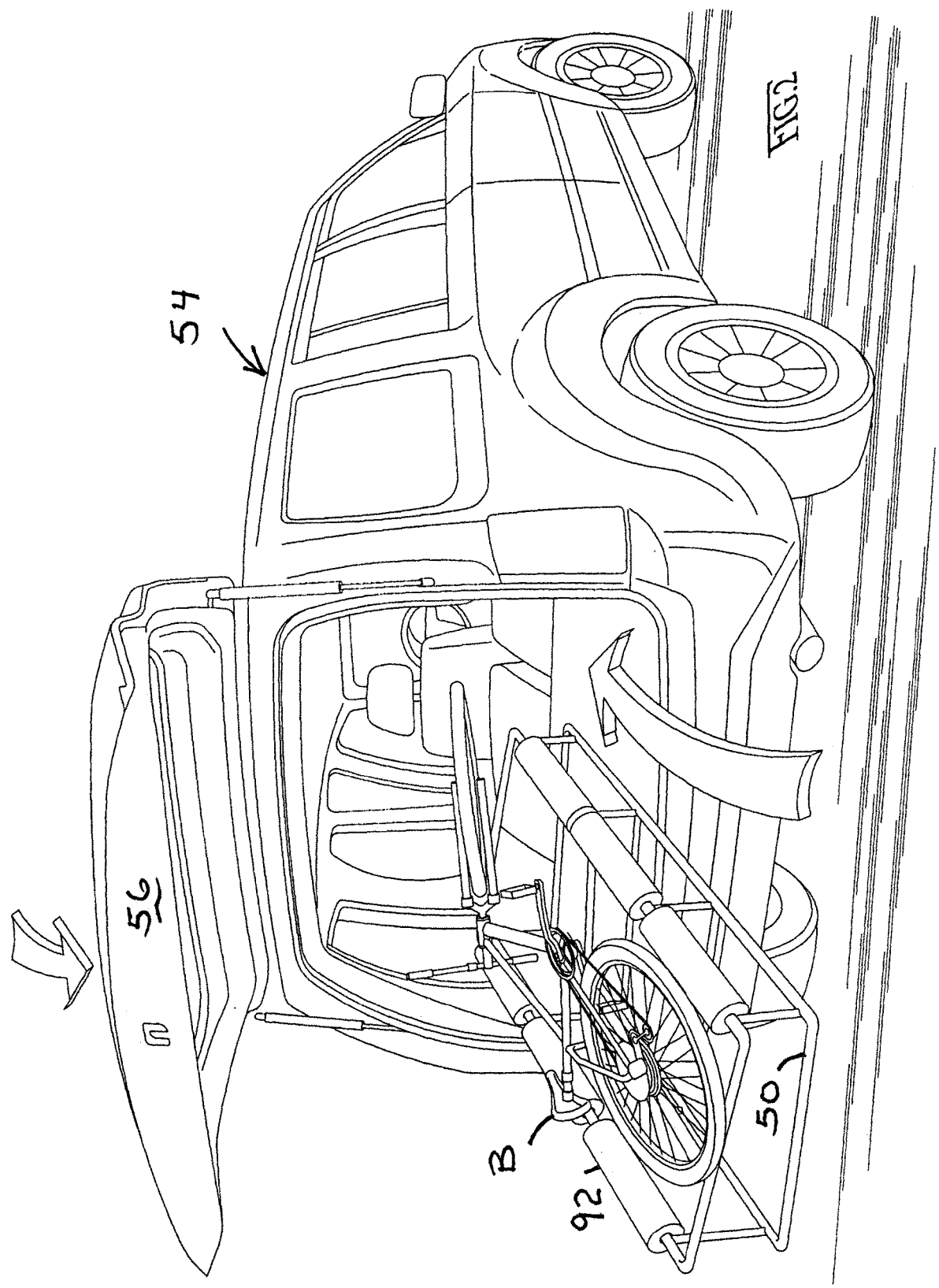

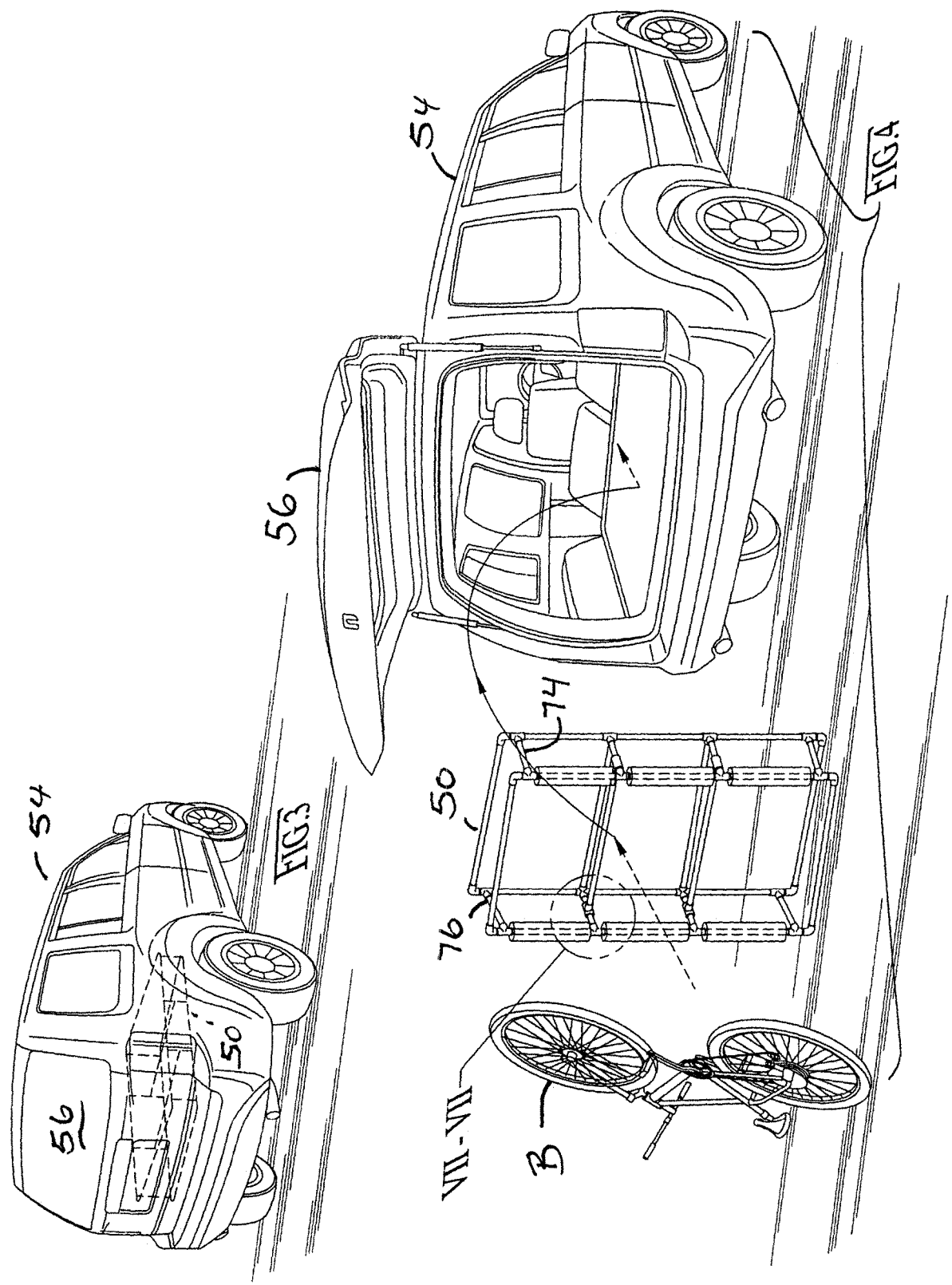

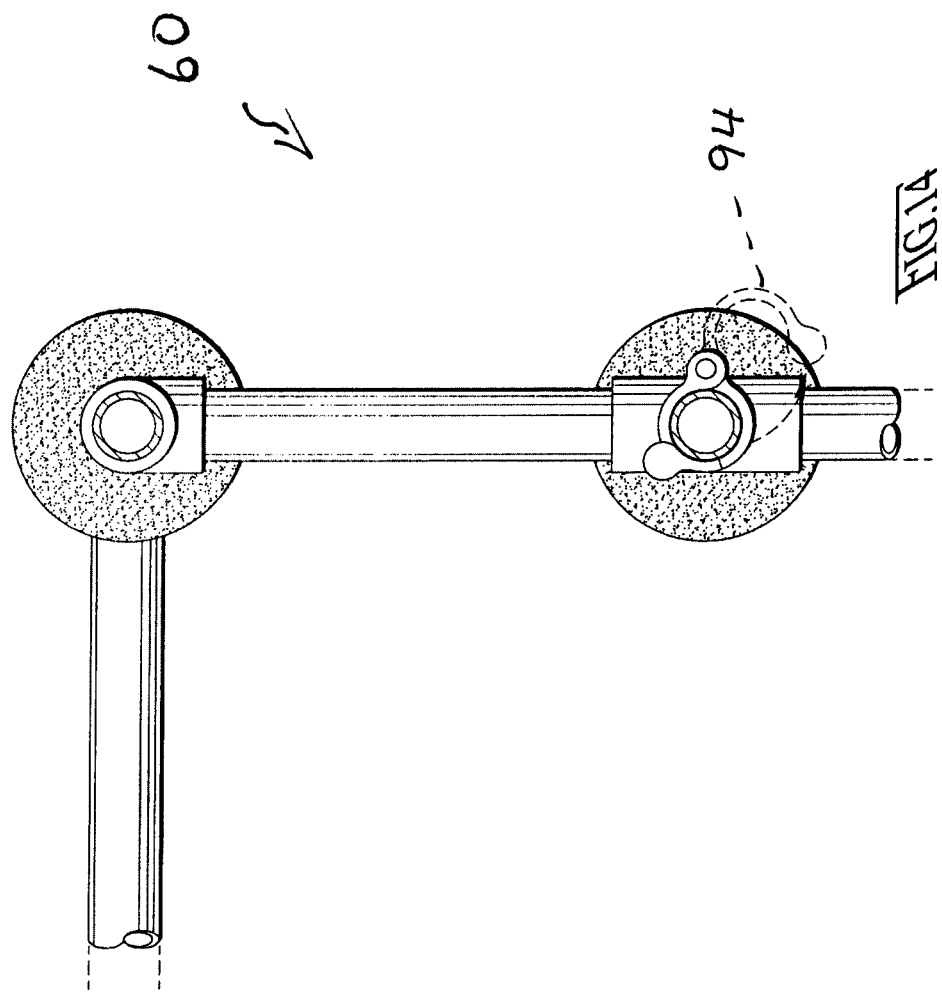

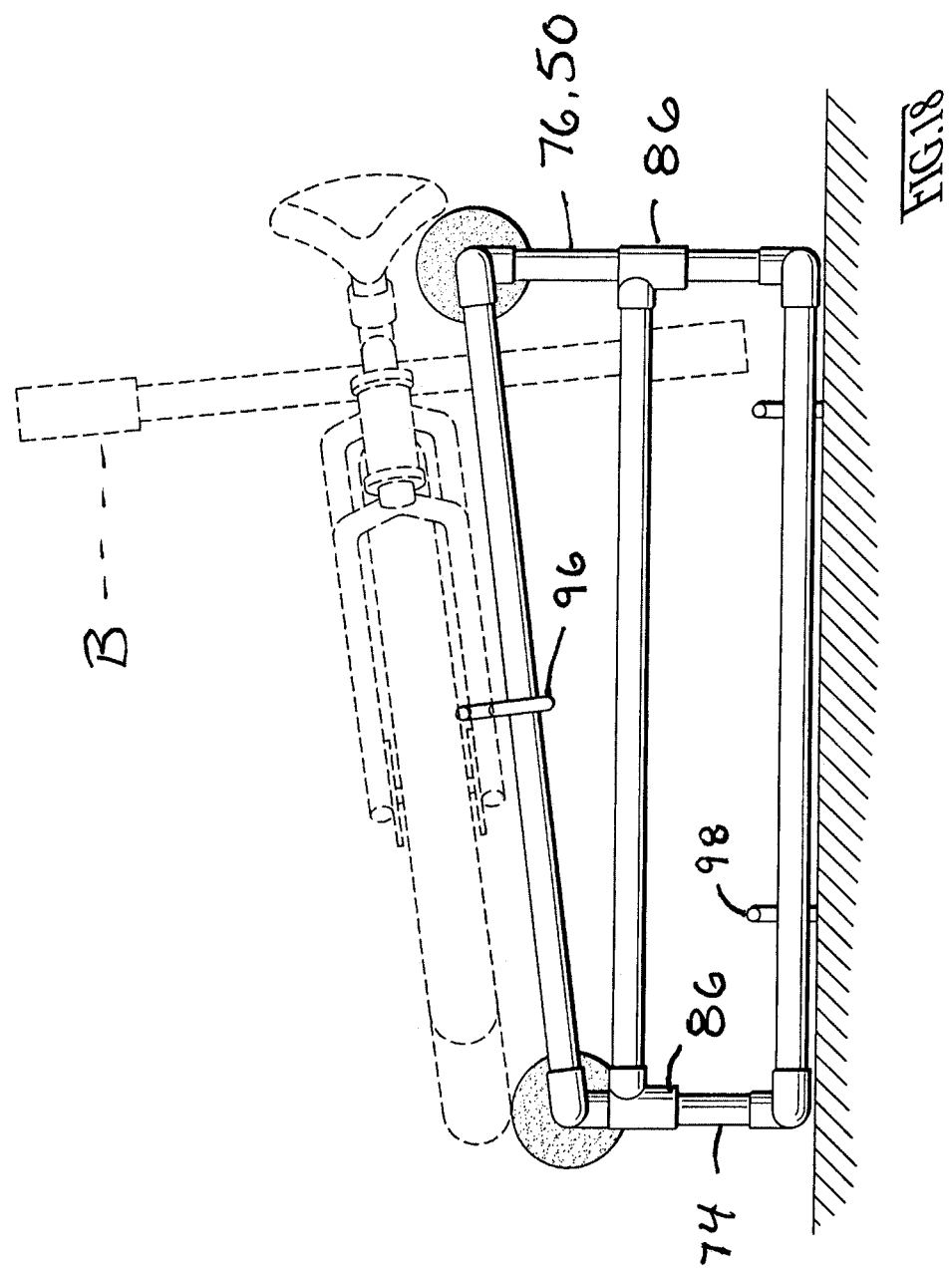

US 12,403,969 B1

FRAME RACK FOR HANGING BICYCLE STORAGE AND STRETCHER-MANNER OF LOADING/UNLOADING AND BICYCLE FERRYING IN VEHICLES, ESPECIALLY THROUGH UPWARD SWINGING REAR DOORS

CROSS-REFERENCE TO PROVISIONAL APPLICATION(S)

This application claims the benefit of U.S. Provisional Application No. 63/274,181, filed Nov. 1, 2021. The foregoing patent disclosure(s) is (are) incorporated herein by this reference thereto.

BACKGROUND AND SUMMARY OF THE INVENTION

The invention relates to bicycle ferrying by passenger motor vehicles and, more particularly, to a frame rack or easel for use with vehicles that have upward swinging rear doors to load/unload and ferry bicycles. The representative motor vehicles served by the invention include sport utility vehicles (SUV's), minivans, hatchbacks and so on. Some of these types of motor vehicles have second and third rows of stadium-style seating for passengers that can be folded down for taking on cargo. The cargo is typically entered and withdrawn though an upward swinging rear door. Such an upward swinging rear door is alternatively referred to as a tailgate regardless of being upward swinging.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIG. 1 is a perspective view of a frame rack in accordance with the invention, for hanging bicycle storage and stretcher-manner of loading/unloading and bicycle ferrying in vehicles, especially through upward swinging rear doors, wherein a mountain-style bicycle is shown in broken lines laying stretched out on its port side on the main shelf (upper frame in this view) of the frame rack;

FIG. 2 is a perspective view showing a representative motor vehicle (as an example and without limitation of motor vehicles that in general would be served by the frame rack in accordance with the invention) in the form of a 2013 HONDA® PILOT® which indeed has an upward swinging rear door for rear access to an interior cargo compartment, wherein the frame rack in accordance with the invention enables stretcher-manner of usage to load and unload a subject bicycle into and out of the vehicle's cargo compartment;

FIG. 3 is a perspective view comparable to FIG. 2 except on a reduced scale and showing the frame rack (without a bicycle yet) loaded into the cargo compartment of the SUV, and the upward swinging rear door is shut, wherein the frame rack can be ferried around in complete protection from the weather and the vehicle can be locked (~ when parked) to provide as much security as locking a vehicle does;

FIG. 4 is a perspective view comparable to FIG. 2 except on a reduced-scale and showing the stretcher-manner of usage to load a subject bicycle into the SUV's cargo compartment through the open rear door by means of the frame rack in accordance with the invention, and which achievement can be executed in six (or so) easy steps by a single user (who is not shown), which execution comprises the following steps:
   a.—open the rear door, pull out the rack, and stand it on one end (and let go of the frame rack, as it can stand by itself as shown);
   b.—by the handle bars or steering column (head tube), lift and tilt the front of the bike up, so that the front tire goes straight up in the air, and stand the bike on its rear tire (the weight of the bike will be borne by the rear tire);
   c.—slide the frame shelf of the frame rack (which has cushioning) against the side of the bike without the sprockets, chain, derailleurs (port side of the bike as shown here);
   d.—let the frame bottom of the frame rack fall against the sill of the rear door-opening (it is preferred to lower it gently, but letting it fall works too);
   e.—lift and slide the frame rack into the compartment by grasping the frame rack's lower end that supports the rear tire (eg., See FIG. 2); and
   f.—shut the upward swinging rear door (eg., See FIG. 3);
wherein this whole process—from start to finish—can be executed by a single user readily in less than two minutes, at a leisurely pace and without making the process a race, after which, the bicycle can be ferried around in complete protection from the weather, and the user can lock the vehicle and go about other business and do other things (like go to work) while the bike is protected safe inside the locked vehicle (which is as safe as anything else locked inside a vehicle) (in other words, the level of safety is much improved over leaving the bicycle hanging on the outside of a rear door, hatchback or trunk, or perched on the roof of a parked vehicle);

Figure 6:
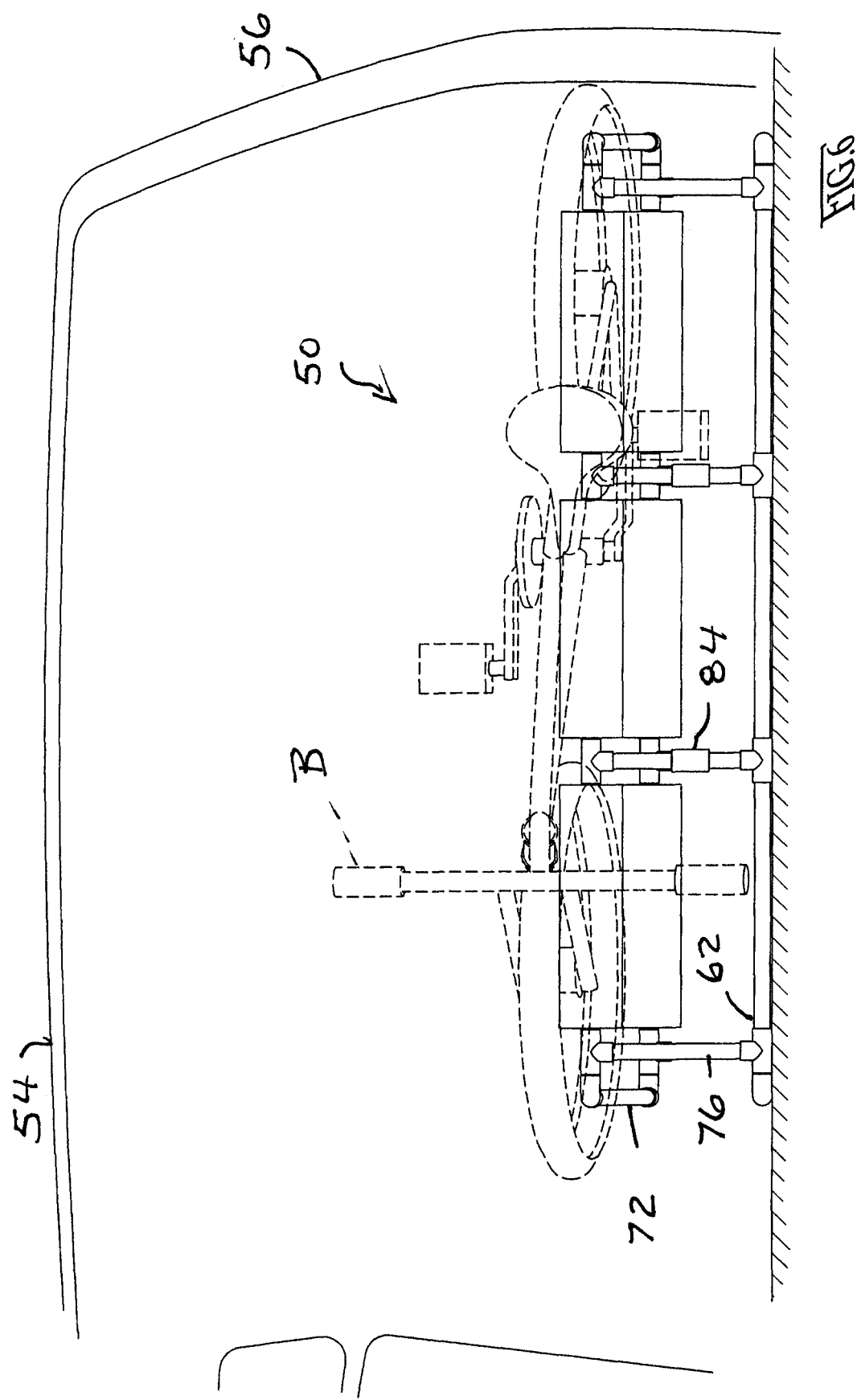
FIG. 6 is a side elevation view taken in the direction of arrows VI-VI in FIG. 5.
Figure 7:
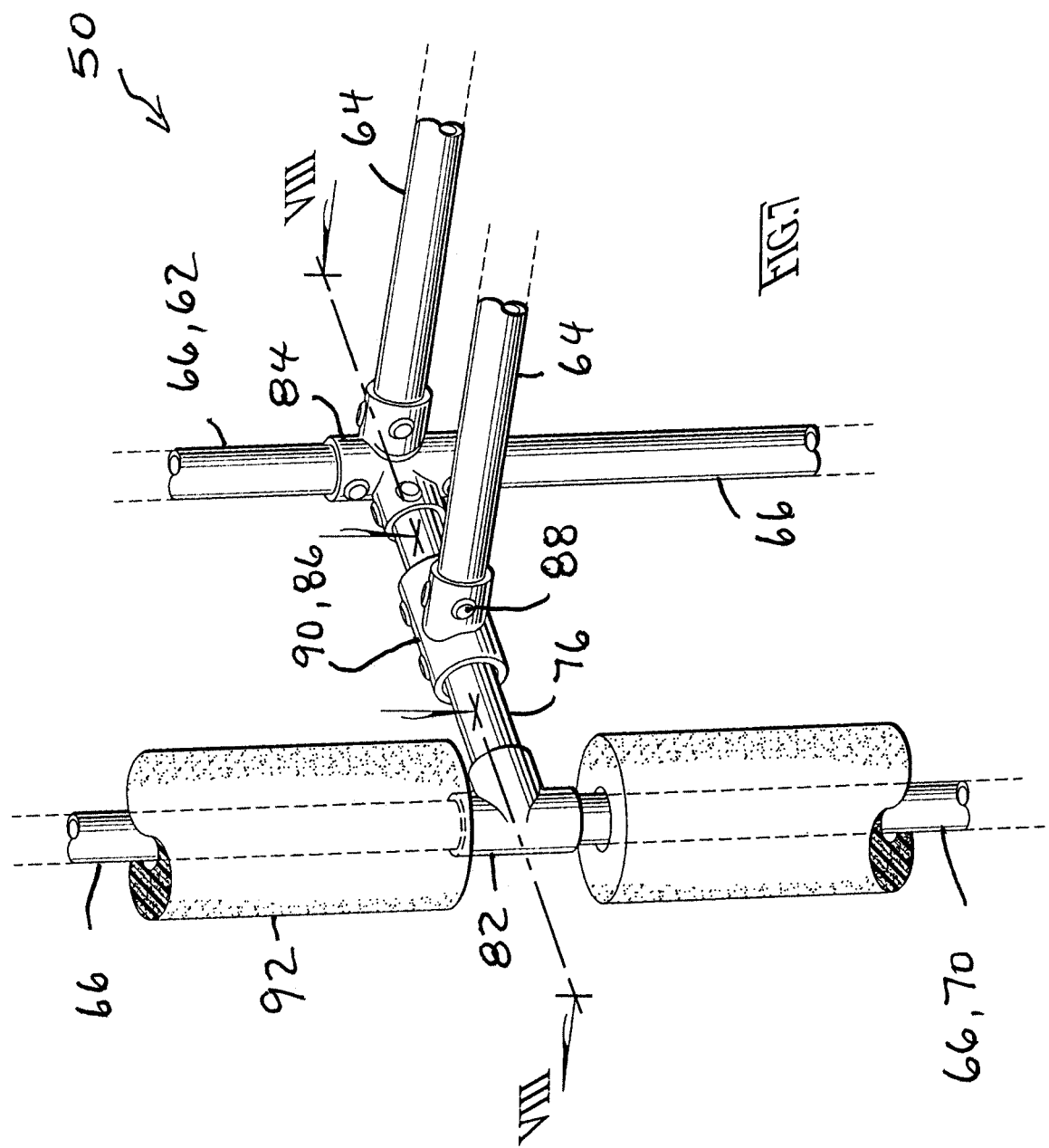
FIG. 7 is an enlarged-scale perspective view of detail VII-VII in FIG. 4.
Figure 8:
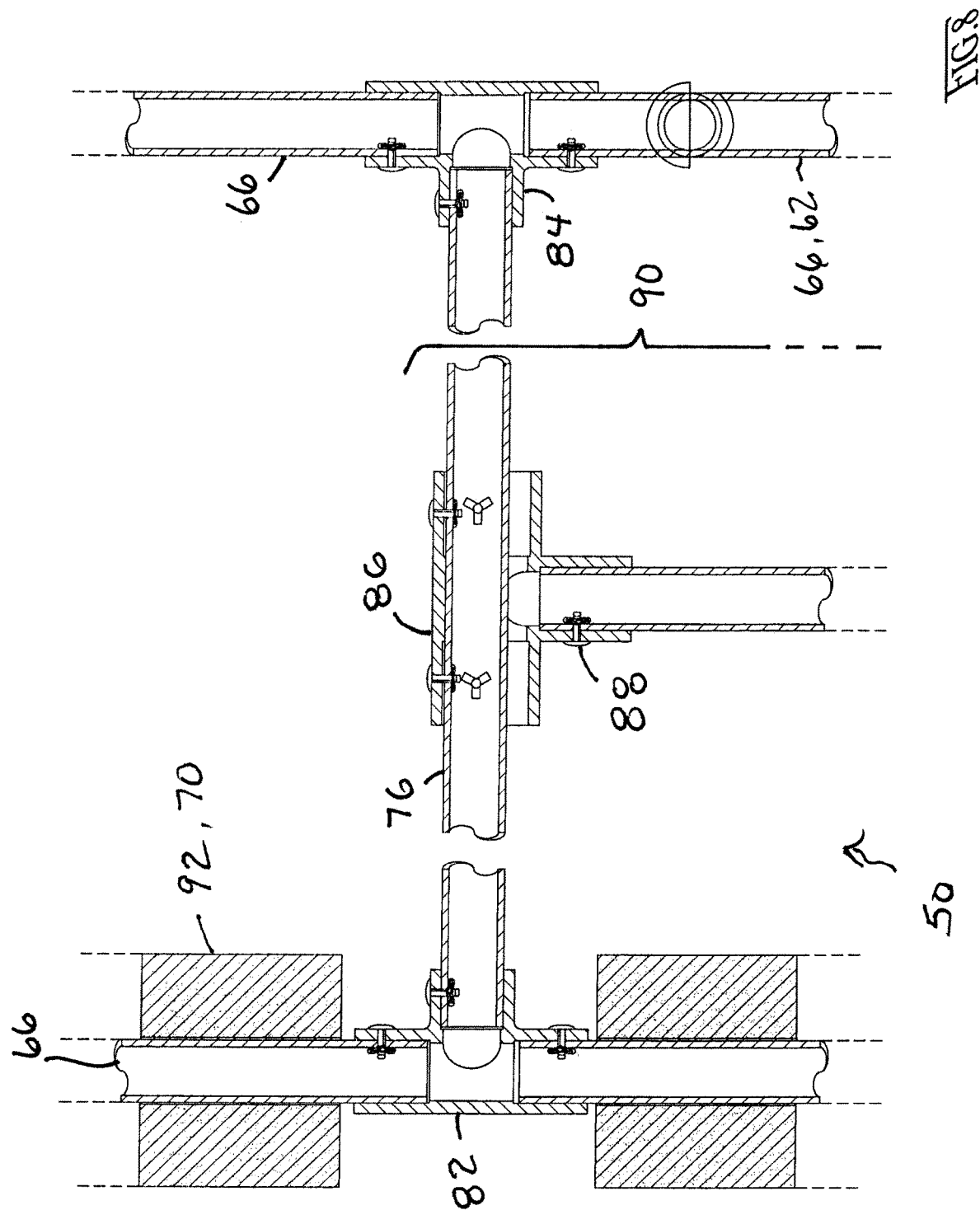
FIG. 8 is an enlarged-scale section view taken in the direction of arrows VIII-VIII in FIG. 7.
Figure 9:
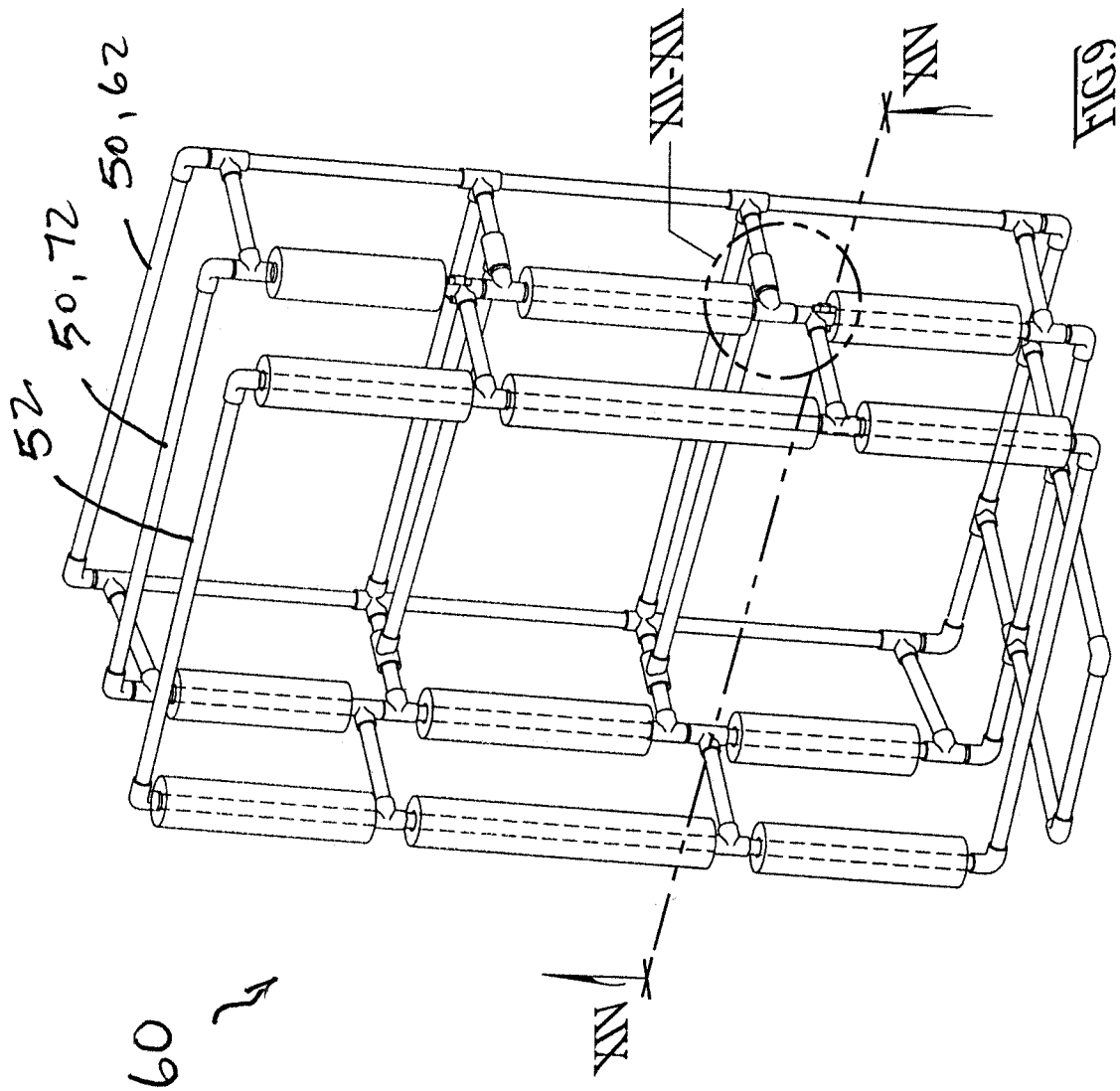
FIG. 9 is a perspective view showing a two-tier combination of a second embodiment (second tier) of a frame rack in accordance with the invention, which combines with the first embodiment frame rack (that is shown in isolation in FIGS. 1-8 and 17-18) for handling two bicycles for vehicle loading/unloading and transport purposes, wherein the first embodiment (first tier) frame rack directly supports a first bicycle and then this second (and complementary) embodiment (second tier) frame rack directly supports a second bicycle.
Figure 10:
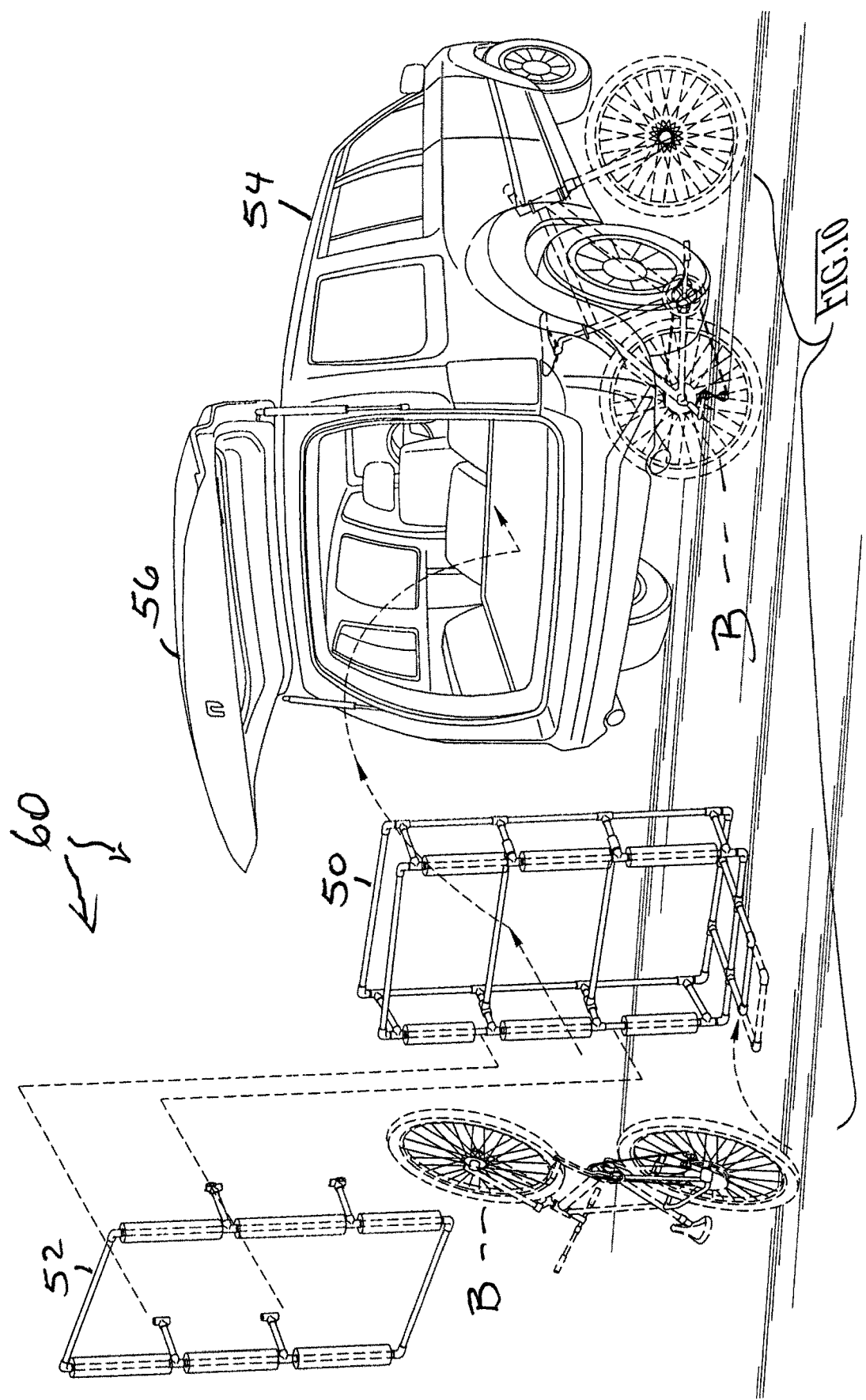
FIG. 10 is a perspective view comparable to FIG. 4 and basically tracking the same steps as a manner of usage, except before proceeding to step (d) above, the first three steps (a), (b) and (c) would have to be approximately repeated for the second bicycle for with the second embodiment frame rack that serves as the second tier and then also executing an intermediate step before proceeding to step (d)
Figure 11:
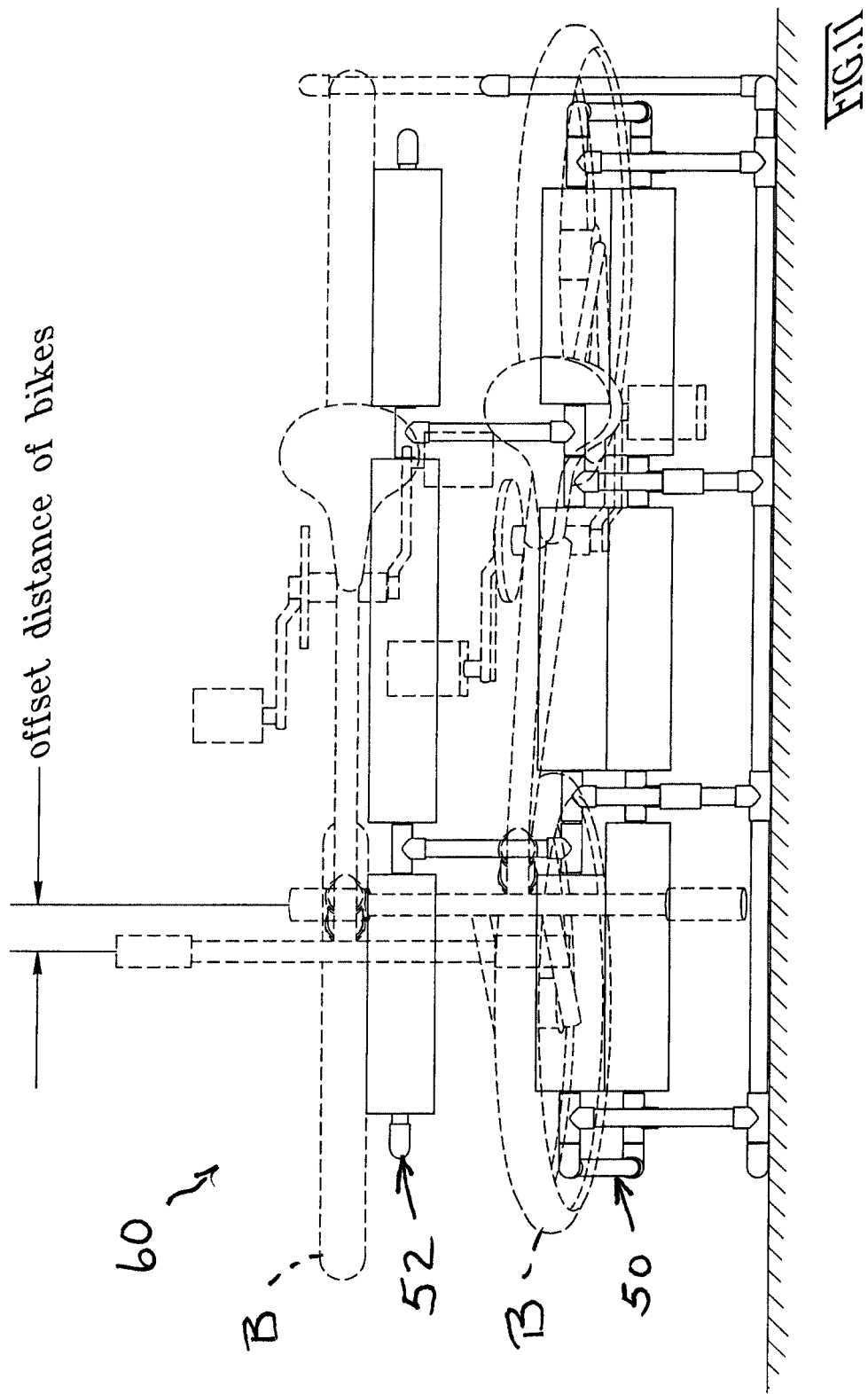
Figure 12:
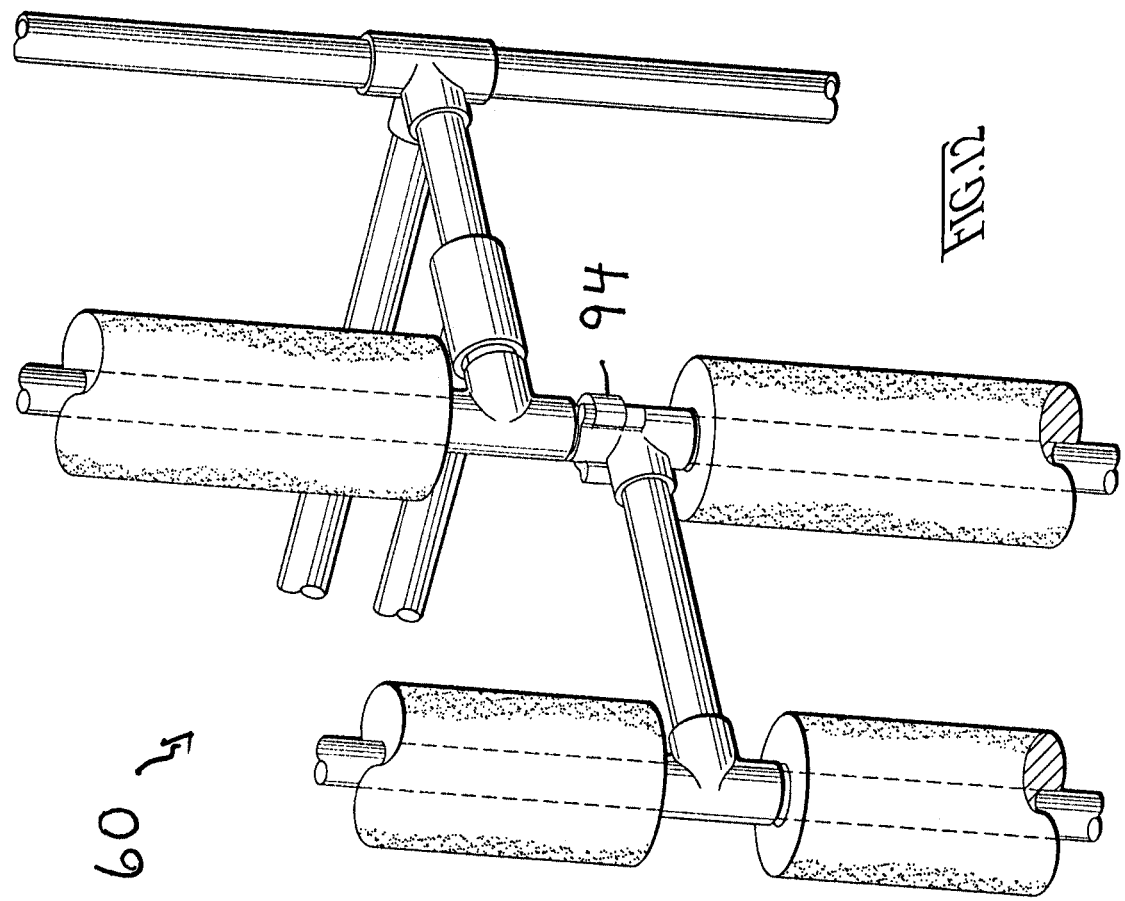
Figure 13:
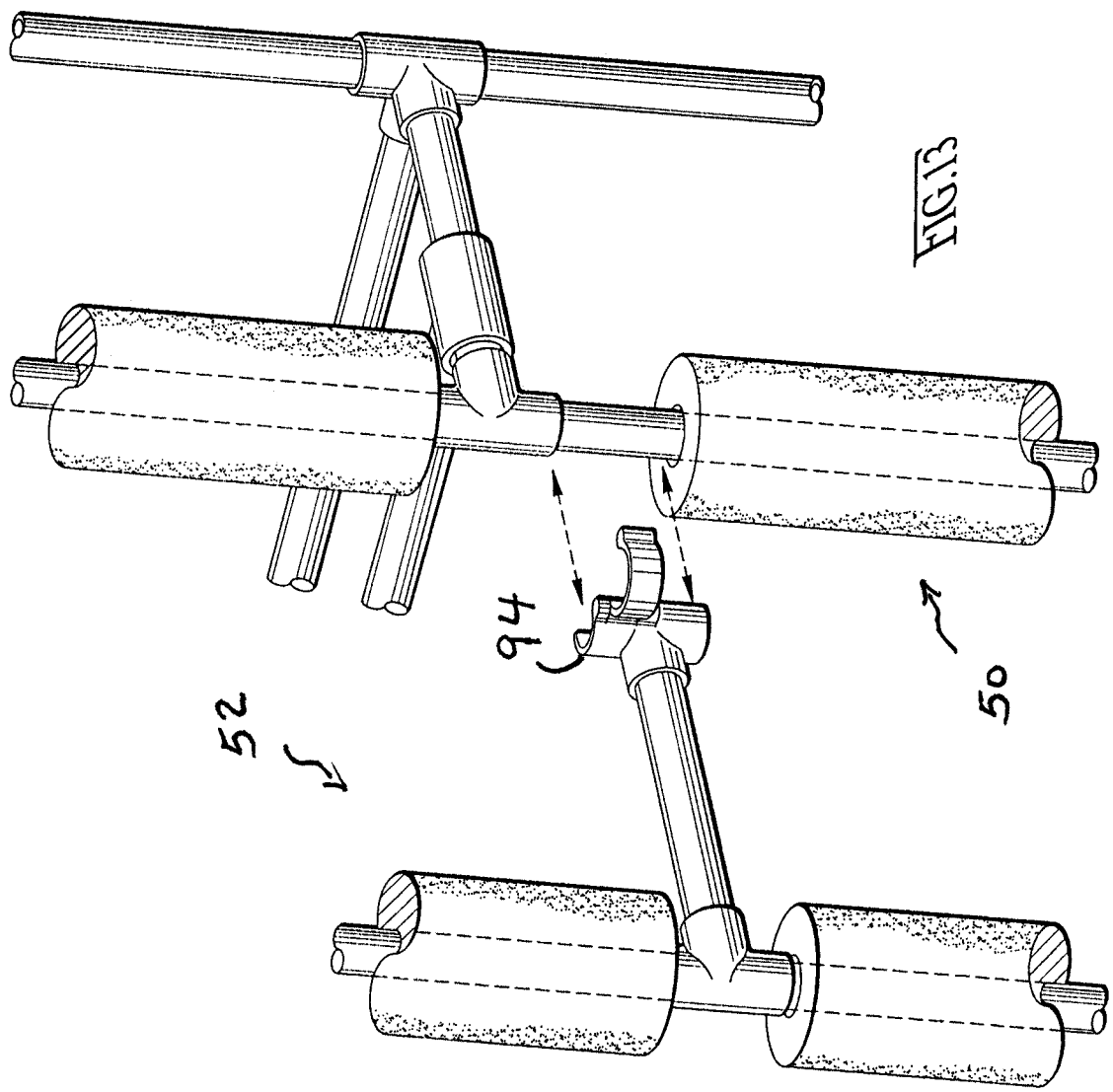
Figure 16:
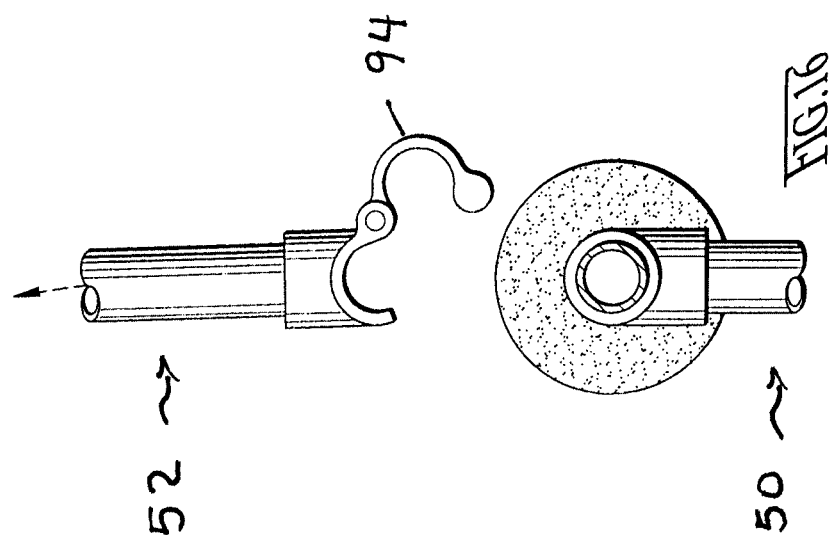
Figure 15:
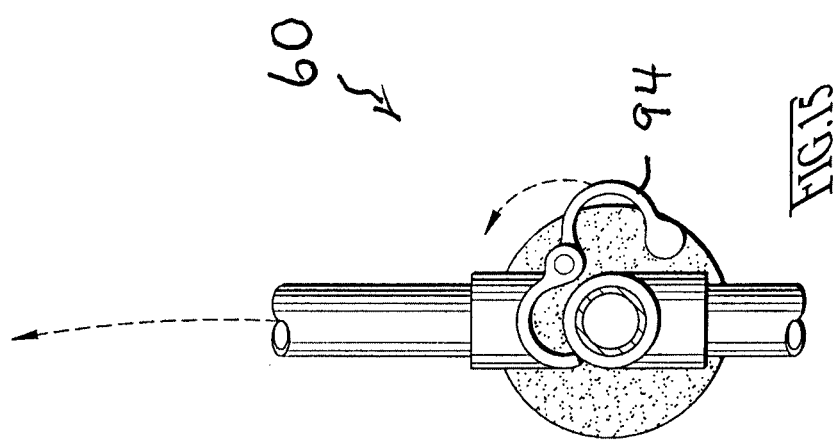
Figure 17:
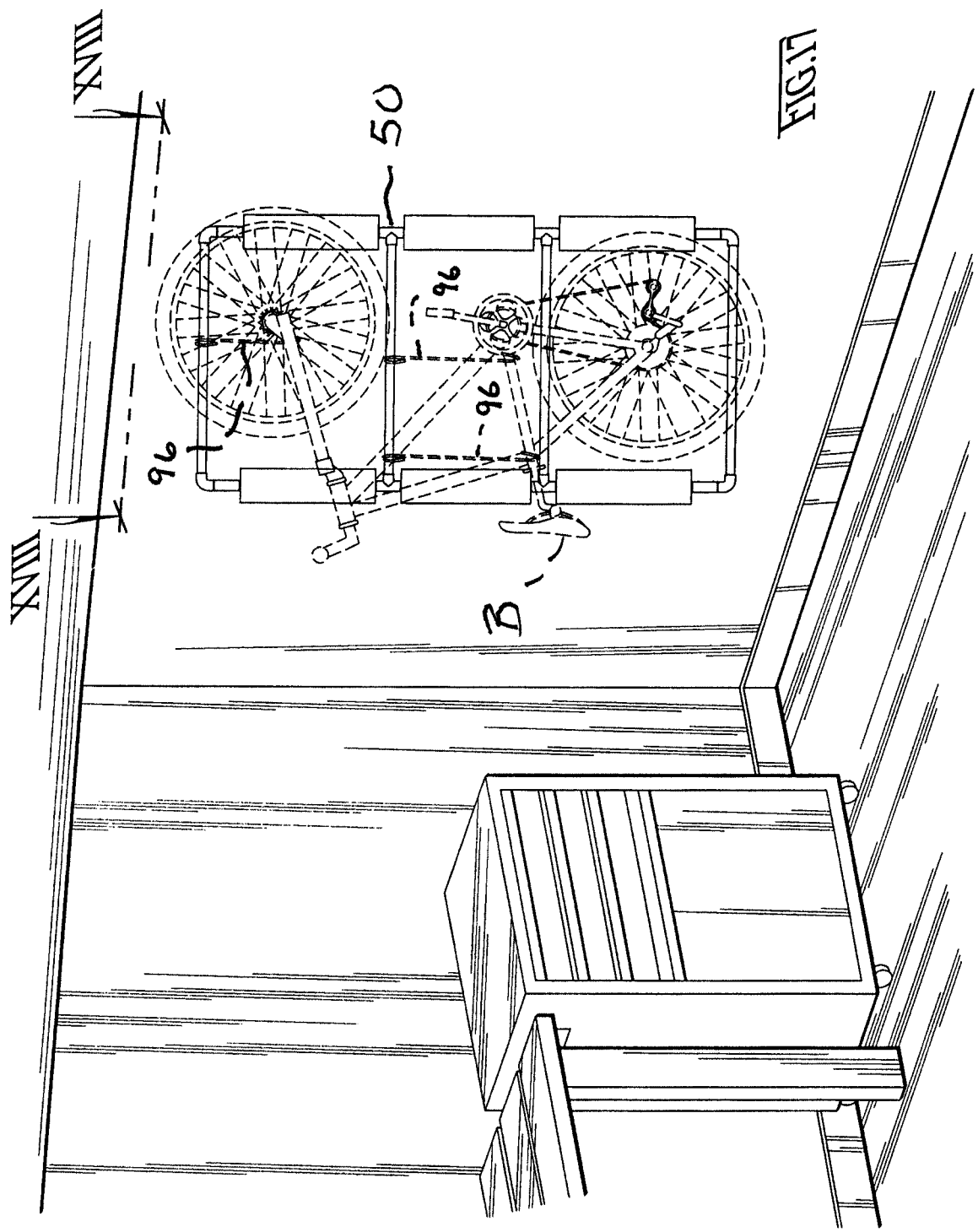

comprising execution of a latching step to latch a set of PVC 'fast' pipe clips to mate the first tier frame shelf and the second tier frame rack together;

FIG. 11 is an elevation view comparable to FIG. 6 except showing the two-tier combination of the first and second embodiments respectively of the frame racks which enable the handling (carrying) of two bikes on their sides, as stacked in two tiers, one bike above the other bike;

FIG. 12 is a perspective view comparable to FIG. 7 but more particularly is an enlarged-scale perspective view of detail XII-XII in FIG. 9, showing details for the two-tier combination of the first and second embodiments of bike racks for carrying two bikes on their sides, including depiction of one latched (or closed or clipped or clamped shut or shut) PVC 'fast' pipe clip;

FIG. 13 is a perspective view comparable to FIG. 12 except showing the one PVC 'fast' pipe clip opened (or undone or un-clipped or un-latched) to allow separation of the first embodiment frame rack and the second embodiment (second tier) frame rack apart from one another;

FIG. 14 is an enlarged-scale section view that is taken in the direction of arrows XIV-XIV in FIG. 9, but which view here is confined to the portion of FIG. 9 contained only in detail XII-XII, wherein this view here additionally shows how the second embodiment (second tier) frame rack couples or mates with the first tier frame shelf of the first embodiment frame rack by a PVC 'fast' (or 'quick) pipe clip, wherein the latched or closed state is shown in solid line, and is latched onto a side beam section of the shelf of the first embodiment frame rack, and the open or un-latched state is shown in dashed line);

FIG. 15 is a section view comparable to FIG. 14, showing the PVC 'fast' pipe clip undone (open), and the second embodiment (second tier) frame rack in the beginning stages of being elevated up or at least moved apart from the frame shelf of the first embodiment frame rack;

FIG. 16 is a section view comparable to FIG. 15 except showing the second embodiment (second tier) frame rack further moved apart from the frame shelf of the first embodiment frame rack;

FIG. 17 is a perspective view showing the first embodiment frame rack in accordance with the invention in service as a hanger for hanging and storing a bicycle on a wall like for example and without limitation a garage wall; and FIG. 18 is a plan view taken in the direction of arrows XVIII-XVIII in FIG. 17.

DETAILED DESCRIPTION OF THE PREFERRED EMBODIMENTS

With general reference to FIGS. 1-8 and 17-18, these views show a first embodiment of a frame rack 50 in accordance with the invention, for hanging bicycle storage (see eg., FIGS. 17-18) and stretcher-manner of loading/unloading and ferrying bicycles B in motor vehicles 54 (see eg., FIGS. 2-4 and 6), especially for loading and unloading that takes place through upward swinging rear doors 56.

A non-limiting example of such a frame rack 50 is constructed out of polyvinyl chloride (PVC) half inch diameter schedule forty tubing, an assortment of PVC fittings (which for the most part have half-inch outlets), all fastened together with tri-folding exploding pop rivets, and cushioning supplied by three-inch diameter styrofoam noodles.

FIG. 1 shows for the most part (other ones of FIGS. 2-8 show certain of the following listed items better):

a base (frame) deck 62 comprising of four elongate cross-bars 64, three elongated beam sections 66 on each side and spacing the four cross-bars 64 apart (hence six beam sections 66 total), and four abbreviated connecting pieces 68 disposed in-line with the beam sections 66 and at each of the four corners of the base (frame) deck 62 (and all are half inch schedule forty PVC tubing pieces);

a spaced or outer (upper here in this view) frame shelf 72 comprising of two elongate cross-bars 64, three elongated beam sections 66 on each side and spacing the two cross-bars 64 apart (hence six beam sections 66 total), and four abbreviated connecting pieces 68 disposed in-line with the beam sections 66 and at each of the four corners of the frame shelf 72 (and all are half inch schedule forty PVC tubing pieces);

four short posts 74 on the starboard side of the frame rack 50 wherein the elevational spacing between the respective starboard-side, side beam assemblies 70 is about seven-and-one half inches apart (in elevation here) (and all are half inch schedule forty PVC tubing pieces);

four moderately longer posts 76 on the port side of the frame rack 50 wherein the elevational spacing the respective port-side, side beam assemblies 70 is about eleven inches apart (in elevation here) (and all are half inch schedule forty PVC tubing pieces);

two additional elongate cross-bars 64 spacing apart the inner short post 74-long post 76 pairs in a plane in between the respective planes of the base (frame) deck 62 and frame shelf 72;

eight half-inch ell-type (elbow) PVC fittings 78;

twelve half-inch tee-type PVC fittings 82;

four half-inch four-way PVC fittings 84 of the side-outlet tee type;

four PVC tee sockets of 86 the ¾x¾x½ type (ie., the opposed in-line outlets are three-fourths inch, the side outlet is half inch);

numerous tri-folding exploding pop rivets 88 (at least one for every outlet of every fitting, ie., an ell fitting 78 has two outlets, a tee fitting 82 has three outlets, a four-way fitting 84 has four outlets); and six sections 92 of styrofoam noodle serving as cushioning and which are slid over the six beam sections 66 of the outer (upper here in this view) frame shelf 72.

Thus base (frame) deck 62 is a planar rectangular form formed by a pair of spaced cross-wise end assemblies 80 spaced apart by a spaced pair of longitudinally-extending side beam assemblies 70. Each end assembly 80 is formed from one cross-bar 64 with each end fitted into an ell fitting 78, and each of the ell fittings 78's other outlet is fitted onto one of the abbreviated connecting pieces 68. So each end assembly 80 comprises a cross-bar 64, two ell fittings 78, and two abbreviated connecting pieces 68. Each side beam assembly 70 comprises a linear assembly of a terminal tee fitting 82, a beam section 66, a four-way fitting 84 (ie., a tee with a side outlet), a second beam section 66, another (eg., second) four-way fitting 84 (again, a tee with a side outlet), a third beam section 66, and another terminal tee fitting 82. The pair of end assemblies 80 are mated with the pair of beam assemblies 70 by mating the abbreviated connecting pieces 68 of the end assemblies 80 with the terminal tee fittings 82 of the beam assemblies 70. Moreover, in the plane of the base (frame) deck 62, it further comprises a third and fourth cross-bar 64 (ie., the first and second cross-bars 64 are part of the end assemblies 80) which connect between the one and the other of the two four-way fittings 84.

The outer frame shelf 72 is similarly but not identically a planar rectangular form formed by a pair of spaced cross-wise end assemblies 80 spaced apart by a spaced pair of longitudinally-extending beam assemblies 70. Each end assembly 80 is formed from one cross-bar 64 with each end fitted into an ell fitting 78, and each of the ell fittings 78's other outlet is fitted onto one of the abbreviated connecting pieces 68. So each end assembly 80 comprises a cross-bar 64, two ell fittings 78, and two abbreviated connecting pieces 68. Each beam assembly 70 comprises a linear assembly of a terminal tee fitting 82, a beam section 66, an interior tee fitting 82, a second beam section 66, another (eg., second) interior tee fitting 82, a third beam section 66, and another terminal tee fitting 82. The pair of end assemblies 80 are mated with the pair of beam assemblies 70 by mating the abbreviated connecting pieces 68 of the end assemblies 80 with the terminal tee fittings 82 of the beam assemblies 70.

The outer frame shelf 72 is wider across the cross-bars 64 than the base (frame) deck 62. If the base (frame) deck 62 is set on a horizontal support surface, the outer frame shelf 72 is propped up by the (leg) posts 74,76 to slope at an inclined angle. The angle is about ten degrees. Thus for the outer frame shelf 72, one beam assembly 70 is the high side and the other beam assembly 70 is the low side. The high side is intended to prop of the handle bar of the bicycle B in plane above the base (frame) deck 62.

Two of the long (leg) posts 76 connect between the terminal tee fittings 82 of one of the beam assemblies of the base (frame) deck 62 and the terminal tee fittings 82 of the high-side beam assembly 70 of the outer frame shelf 72, and then the remaining two long (leg) posts 76 connect between the four-way fittings 84 of the same one beam assembly 70 of the base (frame) deck 62 and the interior tee fittings 82 of the high-side beam assembly 70 of the outer frame shelf 72.

Two of the short (leg) posts 74 connect between the terminal tee fittings 82 of the other of the beam assemblies 70 of the base (frame) deck 62 and the terminal tee fittings 82 of the low-side beam assembly 70 of the outer frame shelf 72, and then the remaining two short (leg) posts 74 connect between the four-way fittings 84 of the same (other) beam assembly 70 of the base (frame) deck 62 and the interior tee fittings 82 of the low-side beam assembly 70 of the outer frame shelf 72.

The long post 76-short post 74 pairs which extend out of the four-way fittings 84 of the base (frame) deck 62 and into the interior tee fittings 82 of the outer frame shelf 72 can be considered to be the interior long post 76-short post 74 pairs. Each of these interior long post 76-short post 74 pairs are braced by a respective cross-wise brace assembly 90 in about the mid-span of each of these four (leg) posts 74,76. This cross-wise brace assembly 90 that is disposed between each of the interior long post 76-short post 74 pairs fixes the spacing between each long post 76-short post 74 pair, so that the long post 76 and short post 74 do not spread apart under weight. Each cross-wise brace assembly 90 comprises a cross-bar 64 which at each end is fitted into the half inch outlet of the ¾x¾x½ tee socket fitting 86. The pair of opposed in-line three-fourths outlets are free to slide on the outside of the respective (leg) post 74 or 76 until fastened by numerous (six or so) tri-folding exploding pop rivets 88 (see FIG. 8).

Cushioning supplied by six three-inch diameter styrofoam noodle sections 92 which are slid over the six beam sections 66 of the outer frame shelf 72.

The completed frame rack 50 as shown in FIG. 4 (among others) weighs less than four kilograms (less than nine pounds).

FIGS. 9-16 show a two-tier combination 60 of a second embodiment (second tier) of a frame rack 52 in accordance with the invention, which combines with the first embodiment frame rack 50 (that is shown in isolation in FIGS. 1-8) for handling two bicycles B for vehicle-loading and transport purposes. Wherein the outer (first tier) frame shelf 72 of the first embodiment frame rack 50 directly supports a first bicycle B and then this second (and complementary) embodiment (second tier) frame rack 52 directly supports a second bicycle B.

The second embodiment frame rack 52 comprises a planar rectangular frame shelf 72 formed by a pair of spaced cross-wise end assemblies 80 spaced apart by a spaced pair of longitudinally-extending beam assemblies 70. Each end assembly 80 is formed from one cross-bar 64 with each end fitted into an ell fitting 78. So each end assembly 80 comprises a cross-bar 64 and two ell fittings 78. Each beam assembly 70 comprises a linear assembly of a terminal beam section 66, an interior tee fitting 82, an interior beam section 66, another interior tee fitting 82, and another terminal (ie., third) beam section 66. The pair of end assemblies 80 are mated with the pair of beam assemblies 70 by mating the ell fittings 78 of the end assemblies 80 with the terminal beam sections 66 of the beam assemblies 70.

Four (leg) posts 74 and/or 76 are fitted into the open side outlets of the interior tee fittings 82. Two of the (leg) posts 76 can be long posts 76 and the two other (leg) posts 74 can be short posts 74 such than when coupled with the outer frame shelf 72 of the first embodiment frame rack 50, they cancel the slope angle: whereby the frame shelf 72 of the second embodiment frame rack 52 is contained in a plane parallel with the plane containing the base (frame) deck 62 of the first embodiment frame rack 50 (eg., see FIG. 11), Preferably each (leg) post 74 and/or 76 of the frame shelf 72 of the second embodiment frame rack 52 terminates at the lower end thereof in a half inch PVC 'fast' (quick clip, quick release) pipe clip 94 (sometimes also referred to as clamps). The are other fittings which can be used interchangeably for the purposes here and would perform essentially the same service, including without limitation snap-on saddle tee fittings, tri-clamps (sanitary or otherwise) and so on.

FIG. 14 shows a PVC 'fast' (or 'quick) pipe clip 94 latched tight onto (as shown in a closed state in solid line) a side beam section 66 of the upper frame shelf 72 of the first embodiment frame rack 50. The PVC 'fast' (or 'quick) pipe clip 94 is alternatively shown in an open state in dashed line. FIG. 15 shows the PVC 'fast' pipe clip 94 in FIG. 14 undone (open), and further shows the second embodiment frame rack 52 in the beginning stages of being elevated up or moved apart from the first embodiment frame rack 50. FIG. 16 shows the second embodiment frame rack 52 further moved apart from the first embodiment frame rack 50 than FIG. 15, and which corresponds to matters in FIG. 13.

FIGS. 17 and 18 show the first embodiment frame rack 50 in accordance with the invention in service as a hanger for hanging and storing a bicycle B on a wall like a garage wall. Three elongated S-hooks 96 (or bungee cords) hang the bike B from the frame rack 50, and a pair of screw hooks 98 hang the frame rack 50 from the garage wall.

Alternatively, both the frame rack 50 and bicycle B could be directly hanging from the screw hooks 98 in the wall. The frame rack 50 hangs directly from the screw hooks 98 as before. The bike B is hung from hook-ended shock cords that perhaps hook onto and extend between two angularly-spaced positions on the front tire and spaced screw hooks 98 (this is not shown). In this alternative manner of hanging use, the frame rack 50 does not perform the same intermediary role as carrying the weight of the bike. But the frame rack 50 does continue to perform the same intermediary role as promoting a stationary vertical hanging position as shown in FIG. 18. The second embodiment frame rack 52 could also be employed in this alternative manner of hanging use. Among other advantages, hanging use of either embodiment of the frame rack 50 or 52 does keep the racks 50 or 52 together with their respective bikes B during non-use and storage.

To return to the very top, this application claims priority in (ie., claims the benefit of) U.S. Provisional Application No. 63/274,181, filed Nov. 1, 2021. And the incorporation by reference is repeated again here for emphasis: the disclosure of U.S. Provisional Application No. 63/274,181, filed Nov. 1, 2021 is once more fully incorporated herein by this reference thereto, but more particularly here as if fully set forth next.

The reason for the emphasis is that, the priority provisional application provides a slide show in twenty-two photographs of the process of unloading out of and loading back into a 2013 HONDA® PILOT @ the mountain bike represented in the line drawings hereof by the process shown and described in the figure descriptions hereof for FIGS. 2-4 hereof.

The description of the process in the provisional application is provided with much more personal observations if not really anymore technical details.

Rather than repeat everything here again word-for-word, just a few select matters will be repeated or re-phrased next.

The tubing pieces and the fittings can be glued together instead of pop-riveted, but glue makes permanent connections. The pop rivets are preferably aluminum. Thus the connections can be undone by drilling out the rivet, and then later re-inserting a new rivet. The rivet being drilled comes undone after the pan head is drilled free of the rivet body. Hence the drill does not go through the hole in PVC a second time. Thus the drill does not reach the hole in PVC and thus does no damaging enlargement of the hole. So to return to the value of riveting versus gluing, when the noodle cushioning material gets a little worn, a few rivets can be drilled out and things can be freshened up with fresh noodle material. Or alternatively, the proportions of the frame rack 50 or 52 can be fine tuned for the dimensions and features of a specific bike.

In FIGS. 2 and 4 hereof, when a user slides the frame rack 50 with a bike B abutting or resting against the outer/upper (frame) shelf 62 in or out through the open tailgate, a couple of observations of the experience are worth re-counting.

Let's start with the loading process. FIG. 4 shows the frame rack 50 stood on end with no support. That is real: the frame rack 50 readily stands up like that by itself.

Note that the high side is aligned with the port side of the vehicle. It is preferred to lay the bike B with the side of the bike B (the port side) that is the opposite side that has the sprockets, chain, derailleurs on that side (ie., the starboard side). It is additionally preferred that the handle bars and seat overhang the high side of the rack 50 (ie., the longitudinal side beam assembly 70 on the port side of the shelf 72 here). It is moreover preferred that the handle bars of the bicycle B will end being disposed close behind the back of the driver's seat.

So the choices of (i) resting the bike B with the sprockets, chain and derailleurs up and (ii) feeding the bike B into the cargo compartment front-tire first apparently dictate the position of where to stand the rack 50 in FIG. 4.

As mentioned before, if the base 62 of the rack 50 is set on a horizontal support surface, the shelf 72 is propped up by respective long and short leg posts 76 and 74 to slope at an inclined angle, about ten degrees. So there is an advantage to overhanging the seat and port handle bar outboard of the longitudinal side beam assembly 70 on the port side of the shelf 72 here. During over-the-road travel, the bike B is jostled enough that it tends to migrate down the slope. But the seat and port handle bar eventually ground out on the longitudinal side beam assembly 70 of the port side of the shelf 72, and stop that migration.

If the rack 50 was configured such that base deck 62 and shelf 72 were contained in parallel planes (which they are not), then the leg posts 74/76 could all have been the same length and the eight corners could have been joined by eight three-way PVC fittings of the elbow type with a side outlet (these are not shown). That is, the eight corners would all have three components extending away orthogonally in an X-plane, the Y-plane and the Z-plane.

But the slope for the shelf 72 as desired. Hence at the corners of the shelf 72, these are executed as an ell-type fitting 78, and abbreviated connecting piece of tubing 68, and a tee-type fitting 82. That way, the tee-type fitting can be spun on its axis through its opposed in-line outlets to aim the side outlet at non-orthogonal angle.

Now to get back to the human activities that comprise the loading process.

The rack 50 is stood as shown in FIG. 4 with the base deck 62 close enough to the rear bumper such when the rack 50 is leaned over, the deck 62 will land on the bumper. Preferably the deck 62 will land on the rear bumper such that the rack 50 leans at about a forty-five degree angle or so. Generally, the rear bumper would hit the base deck 62 of the rack without about two-thirds of the rack 50 below and rear of the bumper, one-third projecting above the line of contact.

To go back before leaning the rack 50 over, the frame rack 50 is sill standing as shown in FIG. 4. The user grasps the bike B by the steering column (~ head tube) with the left hand. The user will lift and tilt the front of the bike B up so that the front tire goes straight up in the air, and stand the bike B on its rear tire. The weight of the bike will be borne by the rear tire.

The bike B is simply leaned against or the shelf 62 of the frame rack 50, and then the fame rack 50 is leaned in turn onto the rear bumper and into the rear opening of the tailgate 54. The bike B is neither strapped nor magnetically attracted nor otherwise mechanically retained to the frame rack 50 other than gravity and friction. The resilient frictional grabbing of the noodle material 92 on the bike B provides substantial gripping. The user is likely to clench both the lowest part of the rear tire and the lowest cross-bar 64 of the deck 62 together by the right hand, and that certainly helps keeping the bike B in place, but in no way is the user lifting the whole weight of the bike B.

The user can pause after leaning the frame rack 50 and bike B on the rear bumper at the rear opening of the tailgate 56, and then let go of everything completely.

The rack 50 will be resting in part on the ground, and resting, in other part on the rear bumper at the rear opening of the tailgate 56. With the rack 50 at that angle of lean (again, about forty-five degrees), the bike B need no stabilization from the user whatsoever. The bike B will readily rest in that position. There are no need for straps to secure the bike B to the rack 50. There is no need for any mechanical retention whatsoever of the bike B to the rack 50 at that angle of lean.

After a pause, the user can re-start the loading process by re-grabbing the lowest cross-bar 64 of the deck 62 with both hands, and then lift and smoothly slide the frame rack 50 and bike B into the cargo compartment and in a short effortless movement.

Hence the frame rack 50 serves as both a tiltable 'easel' and slidable 'drawer' for the bike B. The bike B and rack 50 slide in and out easily. Lifting the bottom end of the rack 50 with the bike B on top (or vice versa lowering it down) is not particularly heavy work because the front end of the rack 50 is supported by progressively by the rear bumper and then the sill of the rear opening. And to repeat from above, the rack 50 itself weighs less than four kilograms (less than nine pounds).

To contrast with a prior art exterior rack or carrier, a user ordinarily has to lift the full weight of the bike B to hang it on a receiver-carried rack of the prior art or perch it on a roof-top carrier of the prior art. Here, the user just has to lift a portion of the weight of the bike B. Nearly half the weight of the bike B is already supported at the front end of the rack 50 by the motor vehicle 54. And the lift is not a free lift anyway. The user is just rocking the rack 50 upward about the pivot contact between the deck 62 and line of contact with the rear bumper. After that, the rack 50 slides as easily as sliding a drawer.

There are no actual 'drawer slides' at work. But the PVC framework of rack 50 provides sufficient low-friction engagement with the sill of the rear opening and then the bed of the cargo compartment that the rack 50 with the bike B on top slide easily in and out as essentially as a drawer.

The whole process of loading or unloading can be accomplished by a single user--from start to finish--readily in less than two minutes.

And the user can readily do so while moving at leisurely pace and without making the process a race. After which, the bicycle can be ferried around in a completely closed motor vehicle 54 in complete protection from the weather. The user can also park and lock the vehicle and then go about other business and do other things (like go to work) while the bike is protected safe inside the locked vehicle (which is as safe as anything else inside a locked vehicle). In other words, the level of safety is much improved over leaving the bicycle hanging on the outside of a tailgate or trunk of a parked vehicle, or perched on top of a parked vehicle, and so on.

FIG. 6 shows that when the rack 50 is resting on a horizontal plane, the loaded bicycle B is tilted a little off horizontal, with the bicycle seat a little higher than the chain sprockets.

Figure 5:
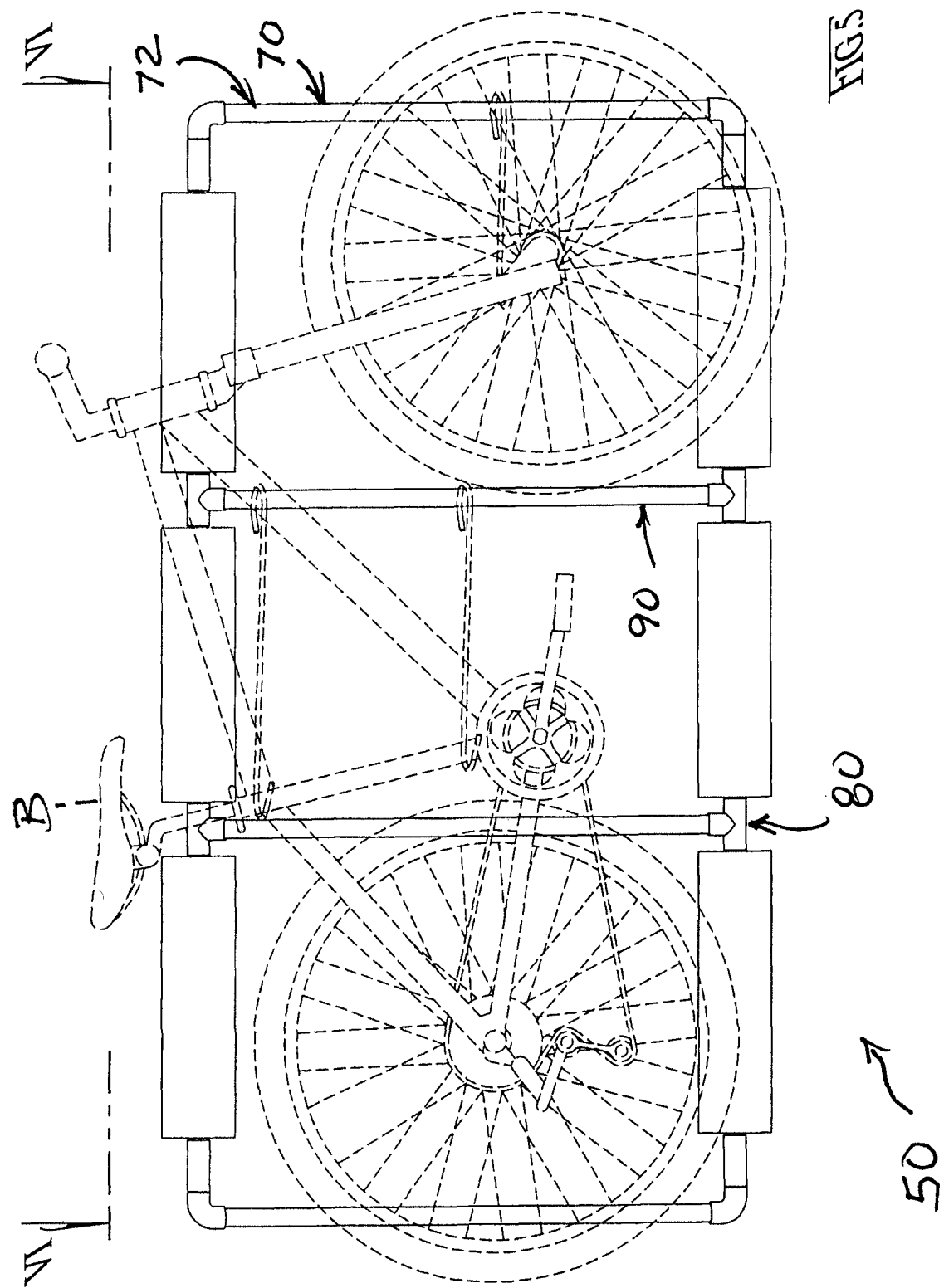
FIG. 5 is a plan view taken in the direction of arrows V-V in FIG. 1.

Re-visiting FIG. 5 allows discussion of the following matters.

It will be recalled that the priority provisional application provides a slideshow of actual photographs of an actual rack 50 and actual bike B (those reference designations do not appear in those photographs). FIG. 5, however, is not drawn to actual scale.

The actual bike B had the following dimensions:
the tire size was twenty-seven inches in diameter;
the wheelbase was forty-two and a half inches;
the length between front axle to crank axle was twenty-five and a half inches;
the length between crank axle to rear axle was seventeen inches;
the elevation of the crank axle above ground was twelve inches;
the overall length was sixty-nine and a half inches;
the base elevation of the steering column (~ head tube) was thirty-one inches;
the base elevation of clearance under the seat was thirty-five inches; and
the base elevation of clearance under the handle bars was forty inches.

(Clearance over the seat and then the handle bars was thirty-nine and forty three inches.)

The significance of the measurement 'base elevation of the steering column (~ head tube)' is that, the steering column (~ head tube) doesn't pivot and flop with the front tire. The steering column (~ head tube) is solid with the rest of the frame of the bike B.

Now to turn to the measurements of the rack 50 shown in the photographs:
the distance between centers of noodles 92 of shelf 72 was twenty-six inches;
the distance between longitudinal extremes of the noodles 92 was forty-six inches; and
the distance between centers of the cross bars 64 of the shelf 72 was fifty-four inches.

Essentially, the shelf 72 of the rack 50 was about as wide as the bike B's measured tire size and about as long as a little bit in excess of the bike B's measured wheel base (ie., distance between centers of the wheel axles).

One more time, when the user closes the tailgate, and locks the vehicle, the user is free thereafter to go to work, and likewise generally free of worries of theft or weather.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An improvement for loading/unloading and ferrying a subject bicycle in a passenger vehicle; the subject bicycle characterized by having:
   handle bars and steering column,
   a seat and seat post,
   front and rear tires,
   front and rear axles, and
   a crank axle, and left and right cranks and pedals;
   the improvement comprising a frame rack for stretcher-manner of loading/unloading and ferrying the subject bicycle in the passenger vehicle; said frame rack comprising:
   a frame base deck for resting on a bed of a cargo compartment of the passenger vehicle;
   a frame outer shelf spaced apart from the frame base deck and having a characteristic longitudinally extending length and a characteristic cross-wise extending width; and
   a plurality of posts interconnecting and spacing apart the frame base deck and frame outer shelf;
   wherein the frame outer shelf has a pair of side beams that are spaced and configured to support the bike, when the frame rack is resting on the bed of the cargo compartment of the passenger vehicle, by the seat/seat post and steering column to rest upon one beam, the front and rear tires upon the other beam, with the front axle, crank axle, one crank, one pedal and the rear axle are all disposed therebetween;
   wherein the plurality of posts comprise a plurality of lengths wherein the frame outer shelf is contained in a frame-outer-shelf plane that is non-parallel to and forms a shallow angle slope with the base plane and whereby accordingly also with the frame base deck
   wherein the one side beam of the frame outer shelf supporting the set/seat tube and steering column is the relatively higher beam when the frame rack is resting on the bed of the cargo compartment of the passenger vehicle, whereby, during over-the-road travel, the bike is jostled enough that the bike tends to migrate down the slope, but the seat and port handle bar eventually ground out on this one side beam of the frame outer shelf and stop that migration.

2. The frame rack for stretcher-manner of loading/unloading and ferrying a subject bicycle in a passenger vehicle of claim 1, wherein:
the width of the frame outer shelf is less than or equal to the subject bike's largest tire diameter.

3. The frame rack for stretcher-manner of loading/unloading and ferrying a subject bicycle in a passenger vehicle of claim 1, further comprising:
sections of resilient frictional grabbing material are provided to at least portions of the respective, spaced side beams of the frame outer shelf;
whereby providing substantial gripping of the seat post and steering column on the one beam and the front and rear tires on the other beam.

4. The frame rack for stretcher-manner of loading/unloading and ferrying a subject bicycle in a passenger vehicle of claim 3, wherein:
the sections of resilient frictional grabbing material are tubular;
whereby the one side beam of the frame outer shelf furthermore provides substantial outboard frictional grabbing to the of the overhanging, slid down seat and low handle bar.

5. The frame rack for stretcher-manner of loading/unloading and ferrying a subject bicycle in a passenger vehicle of claim 3, wherein:
the frame rack defined by the frame base deck, frame outer shelf and short posts extends longitudinally between spaced ends;
one end is defined by cross-wise members that can be rested on ground behind the passenger vehicle when parted and prior to loading the bicycle;
wherein the one end is configured and arranged such the frame bike rack can stand on that one end by itself, with the bike-carrying side beams of the frame outer shelf, when given level ground, will point up to the sky.

6. The frame rack for stretcher-manner of loading/unloading and ferrying a subject bicycle in a passenger vehicle of claim 5, wherein:
wherein the sections of resilient frictional grabbing material provide substantial frictional grabbing of the bike during the loading operation while the bike is stood up on the rear tire, leaned against the standing rack, and all during while the rack is leaned down against a rear bumper or sill or threshold of an opening into the cargo compartment of the passenger vehicle, and continuing providing substantial frictional while the frame rack with the bike on board is grabbed proximate the one end and titled to level or near level, whereafter the frame rack with bike onboard are slid into the cargo compartment, whereby like a drawer.

7. An improvement for loading/unloading and ferrying a subject bicycle in a passenger vehicle; the subject bicycle characterized by having:
handle bars and steering column,
a seat and seat post,
front and rear tires,
front and rear axles, and
a crank axle, and left and right cranks and pedals;
the improvement comprising a frame rack for stretcher-manner of loading/unloading and ferrying the subject bicycle in the passenger vehicle; said frame rack comprising:
a frame base deck for resting on a bed of a cargo compartment of the passenger vehicle;
a frame outer shelf spaced apart from the frame base deck and having a characteristic longitudinally extending length and a characteristic cross-wise extending width; and
a plurality of posts interconnecting and spacing apart the frame base deck and frame outer shelf;
wherein the frame outer shelf has a pair of side beams that are spaced and configured to support the bike, when the frame rack is resting on the bed of the cargo compartment of the passenger vehicle, by the seat/seat post and steering column to rest upon one beam, the front and rear tires upon the other beam, with the front axle, crank axle, one crank, one pedal and the rear axle are all disposed therebetween;
wherein the frame base deck is configured from tubular components and fittings therefor to form a first rectangular outline having spaced longitudinally-extending side beams formed of tubular components and fittings therefor, which longitudinally-extending side beams are spaced by cross-wise extending cross-wise assemblies formed of tubular components and fittings therefor;
the frame outer shelf is configured from tubular components and fittings therefor to form a second rectangular outline having spaced longitudinally-extending side beams formed of tubular components and fittings therefor, which longitudinally-extending side beams are spaced by cross-wise extending cross-wise assemblies formed of tubular components and fittings therefor;
the respective side beams of the frame base deck and the frame outer shelf have lengths which are generally equal to each other; and
the respective cross-wise assemblies of the frame base deck and the frame outer shelf have lengths which are correspondingly respectively generally unequal to each other as the respective side beams of the frame base deck and the frame outer shelf have the lengths which are correspondingly the same degree generally equal to each other, to thereby accord a shallow angle slope.

8. The frame rack for stretcher-manner of loading/unloading and ferrying a subject bicycle in a passenger vehicle of claim 7, wherein:
the fittings for the tubular components comprise ell-type polymeric fittings and tee-type polymeric fittings.

9. An improvement for loading/unloading and bicycle ferrying in passenger vehicles for bicycles characterized by having:
handle bars and steering column,
a seat and seat post,
front and rear tires,
front and rear axles, and
a crank axle, and left and right cranks and pedals;
the improvement comprising a frame rack for stretcher-manner of loading/unloading and bicycle ferrying in passenger vehicles; said frame rack comprising:
a frame base deck contained in a base plane for resting on a bed of a cargo compartment of the passenger vehicle;
a frame outer shelf spaced apart from the frame base deck and contained in an outer/upper plane;

the frame outer shelf having a pair of longitudinal beams contained in the outer/upper plane which are laterally spaced apart; and a plurality of short posts interconnecting the frame base deck and frame outer shelf;

wherein the frame base deck and frame outer shelf are spaced apart by the short posts and altogether form, when resting on the bed of the cargo compartment of the passenger vehicle, a short frame stretcher having an elongate longitudinal length and an elongate cross-wise width;

wherein one of the longitudinal beams of the frame outer shelf is elongated for the seat/seat post and steering column to rest upon this one beam, and the short posts propping up this one bean have sufficient length so the handle bar in the low position is propped and does not hit the bed of the cargo compartment of the passenger vehicle;

wherein other of the longitudinal beams of the frame outer shelf is elongated for the front and rear tires to rest upon this other beam and is cross-wise spaced from the one beam such that the front axle, crank axle, one crank, one pedal and the rear axle are all disposed therebetween;

wherein the frame base deck comprises a pair spaced longitudinally-extending side beams, which longitudinally-extending side beams are spaced by cross-wise extending cross-wise assemblies;

the plurality of posts comprise a plurality of lengths wherein the frame outer shelf is contained in a frame-outer-shelf plane that is non-parallel to and forms a shallow angle slope with the base plane and whereby accordingly also with the frame base deck;

wherein the one side beam of the frame outer shelf is relatively higher when the frame rack is resting on the bed of the cargo department of the passenger vehicle than the other side beam of the frame outer shelf, whereby bike rests on a shallow slope and the handle bars and seat overhang this one side beam; and whereby, during over-the-road travel, the bike is jostled enough that the bike tends to migrate down the slope, but the seat and port handle bar eventually ground out on this one side beam assembly the frame outer shelf and stop that migration.

10. The frame rack for stretcher-manner of loading/unloading and bicycle ferrying in passenger vehicles of claim 9, wherein:

the frame base deck is configured from tubular components and fittings therefor to form a rectangular outline;

the frame outer shelf is configured from tubular components and fittings therefor to also form a rectangular outline; and wherein the respective rectangular outlines are not co-equal.

11. The frame rack for stretcher-manner of loading/unloading and bicycle ferrying in passenger vehicles of claim 9, wherein:

the respective side beams of the frame base deck and the frame outer shelf have lengths which are generally equal to each other; and the respective cross-wise assemblies of the frame base deck and the frame outer shelf have lengths which are correspondingly respectively generally unequal to each other as the respective side beams of the frame base deck and the frame outer shelf have the lengths which are correspondingly the same degree generally equal to each other, to thereby accord the shallow angle slope.

12. The frame rack for stretcher-manner of loading/unloading and bicycle ferrying in passenger vehicles of claim 9, further comprising:

sections of resilient frictional grabbing material are provided to at least portions of the respective, spaced side beams of the frame outer shelf;

whereby providing substantial gripping of the seat post and steering column on the one beam and the front and rear tires on the other beam.

13. The frame rack for stretcher-manner of loading/unloading and bicycle ferrying in passenger vehicles of claim 12, wherein:

the sections of resilient frictional grabbing material are tubular;

whereby the one side beam of the frame outer shelf furthermore provides substantial outboard frictional grabbing to the of the overhanging, slid down seat and low handle bar.

14. The frame rack for stretcher-manner of loading/unloading and bicycle ferrying in passenger vehicles of claim 9, wherein:

the tubular components comprise a plastic or polymeric tubular material.

15. The frame rack for stretcher-manner of loading/unloading and bicycle ferrying in passenger vehicles of claim 14, wherein:

the fittings for the tubular components comprise ell-type polymeric fittings and tee-type polymeric fittings.

16. The frame rack for stretcher-manner of loading/unloading and bicycle ferrying in passenger vehicles of claim 15, wherein:

the fittings for the tubular components comprise four-way PVC fittings; and the tee-type polymeric fittings include tee socket fittings wherein the respective three outlets thereof have at least two different characteristic diameters.

17. The frame rack for stretcher-manner of loading/unloading and bicycle ferrying in passenger vehicles of claim 16, wherein:

the tubular components and fittings therefor are fastened by mechanical fasteners.

18. The frame rack for stretcher-manner of loading/unloading and bicycle ferrying in passenger vehicles of claim 17, wherein:

the mechanical fasteners comprise aluminum pop rivets.

* * * * *